July 10, 1962 — M. D. JENNINGS — 3,043,251

HILL DROP PLANTING APPARATUS

Filed Jan. 9, 1961 — 2 Sheets-Sheet 2

INVENTOR
Marvin D. Jennings

ATTORNEY

United States Patent Office 3,043,251
Patented July 10, 1962

3,043,251
HILL DROP PLANTING APPARATUS
Marvin D. Jennings, Naperville, Ill., assignor to International Harvester Company, Chicago, Ill., a corporation of New Jersey
Filed Jan. 9, 1961, Ser. No. 81,416
4 Claims. (Cl. 111—15)

This invention relates to agricultural implements and particularly to planters. More specifically, the invention concerns novel planting apparatus for hill dropping seed.

The present invention is concerned primarily with a planter of the type utilizing a pair of annular flexible elements mounted on the periphery of a rotatable disk or disks and adapted to receive therebetween seed from a hopper at regularly spaced intervals, and to discharge it into the furrow with uniform spacing between seeds.

An object of the invention is the provision of novel means for accumulating the seed in groups for depositing in the furrow.

Another object of the invention is the provision of a seed accumulator disposed between the flexible elements of the seed receiving disk and rotatable by frictional engagement therewith, and means for periodically immobilizing the accumulator, said accumulator having a part disposed in the path of the seed.

Another object of the invention is the provision of a planter of the type referred to wherein the accumulator is periodically released to permit the seed to be deposited in groups.

Other objects and advantages of the invention will become clear from the following detailed description when read in conjunction with the accompanying drawings wherein.

Figure 1:
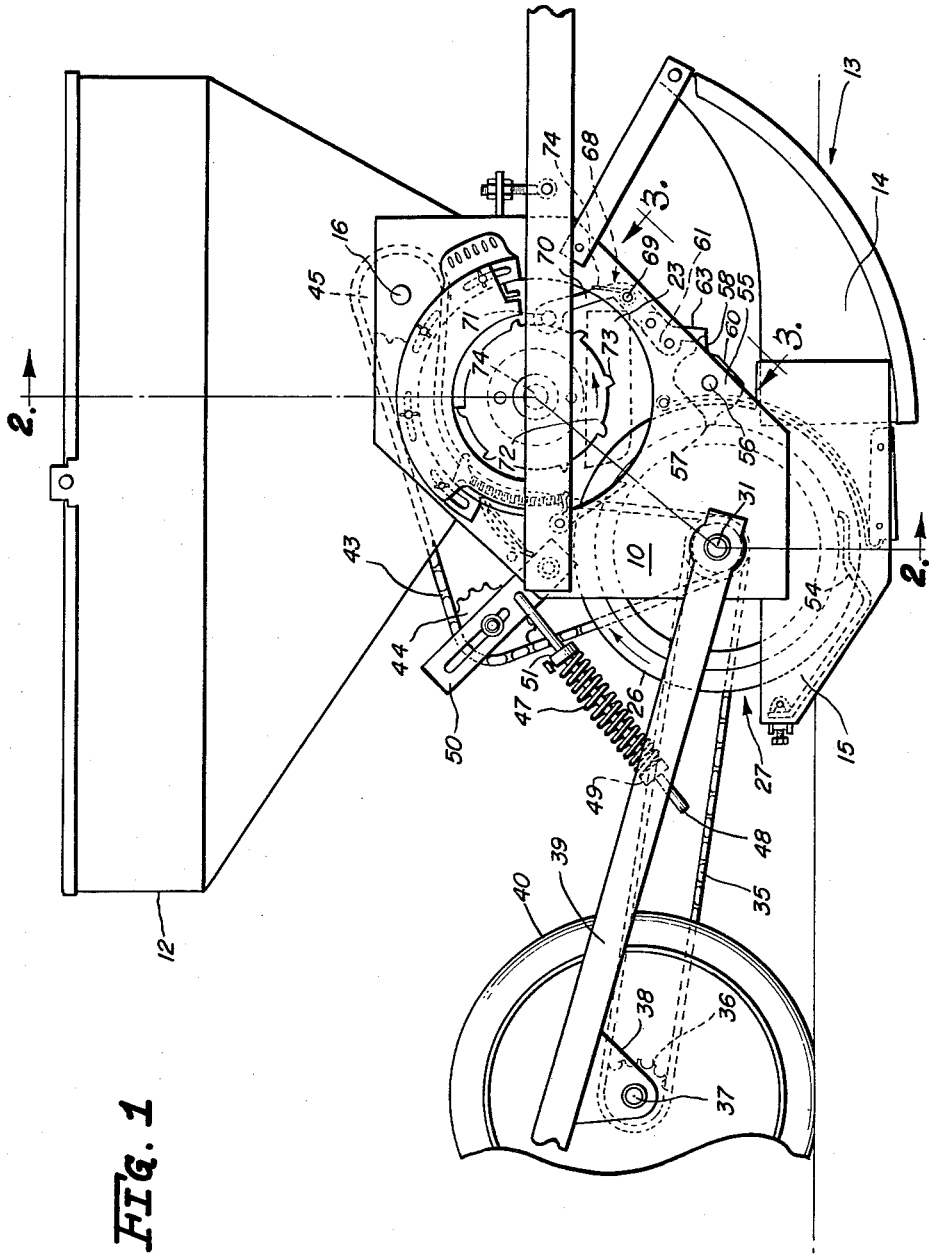
FIGURE 1 is a view in side elevation of a ground driven planer unit having incorporated therein the features of this invention.

The planter frame comprises a pair of spaced plates 10 and 11 supporting at their upper ends a seed hopper 12 and at their lower ends a furrow opener 13 having a forward earth penetrating section 14 and a tail section comprising spaced plates 15.

A shaft 16 is rotatable in bearings 17 and 18 carried by the upper ends of the plates 10 and 11 and has mounted thereon an agitator 19 disposed in the lower part of the hopper to facilitate passage of seed between guide sections 20 and 21, secured to the walls 10 and 11, to a dispensing member in the form of a seed wheel 22 comprising spaced members between the lower portions of which is inserted a stripper 23 secured to the wall 11. Seed wheel 22 is mounted upon a shaft 24 rotatable in a bearing 25 carried by frame wall 11. The lower portion of the seed wheel 22 is disposed between a pair of annular members 26 made of flexible material such as rubber, or the like, forming the rim or periphery of a seed discharging wheel 27.

Wheel 27 has a main disk-like body 28 with clamping elements 29 thereon for securing the annular flexible members 26 to the wheel. Wheel 27 has a hub 30 secured to a shaft 31 rotatably mounted in bearings 32 and 33 carried by the frame members 10 and 11, and the lower portion of the wheel 27 is disposed between the sides 15 of the tail section of furrow opener 13.

Flexible annular members 26 are spread by the lower portion of seed wheel 22, and seed discharged from the seed wheel by the stripper 23 is received between the members 26 and held there by the inherent inward bias thereof.

Shaft 31 and wheel 27 are driven in the direction of the arrow in FIGURE 1 by the provision of a sprocket wheel 34 connected by a drive chain 35 with a sprocket wheel 36 mounted on a shaft 37 carried by a bracket 38 secured to the rear end of a bar 39, the forward end of which is pivoted upon the bearing 32. Bar 39 is one of a pair straddling a ground-engaging wheel 40 mounted on axle 37, the other bar 41 having its forward end pivotally mounted upon the bearing 33.

Wheel 40 drives chain 35 and shaft 31 carrying the seed discharge wheel 27. Another sprocket wheel 42 on shaft 31 is drivingly connected by a chain 43, trained over an idler 44, with a sprocket wheel 45 mounted on agitator shaft 16. Chain 43 also engages a sprocket wheel 46 mounted on shaft 24 to drive the seed wheel 22.

Drive wheel 40 is resiliently urged to the ground by a coil spring 47 surrounding a rod 48 slidably received in an opening provided in a bar 49 extending between bars 39 and 41. The upper end of the rod is connected to a bracket 50, secured to the planter frame and carrying idler sprocket wheel 44. One end of spring 47 engages bar 49 and the other end engages an adjustable collar 51 mounted on the rod.

Figure 2:
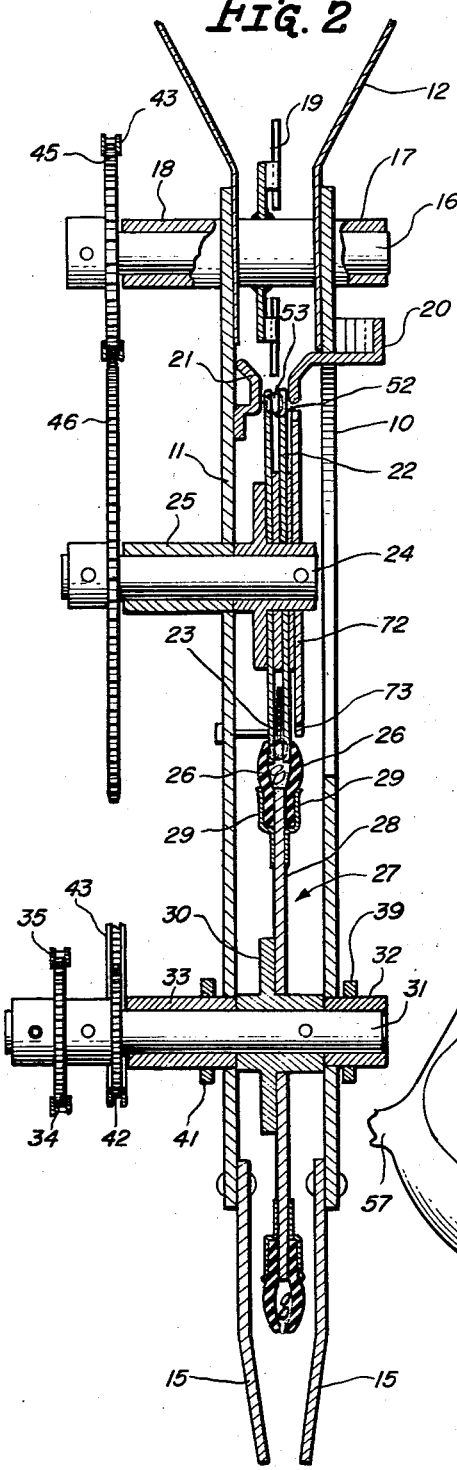
FIGURE 2 is a sectional view with parts removed taken on the line 2—2 of FIGURE 1 and showing only the lower portion of the planter.
Figure 3:
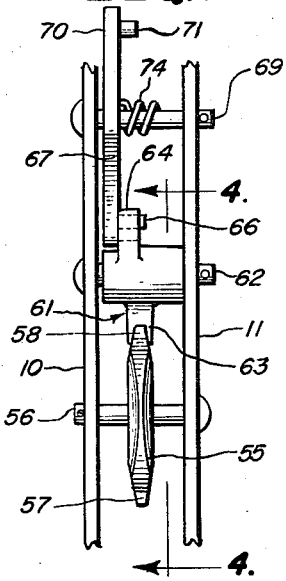
FIGURE 3 is a section taken on the line 3—3 of FIGURE 1.
Figure 4:
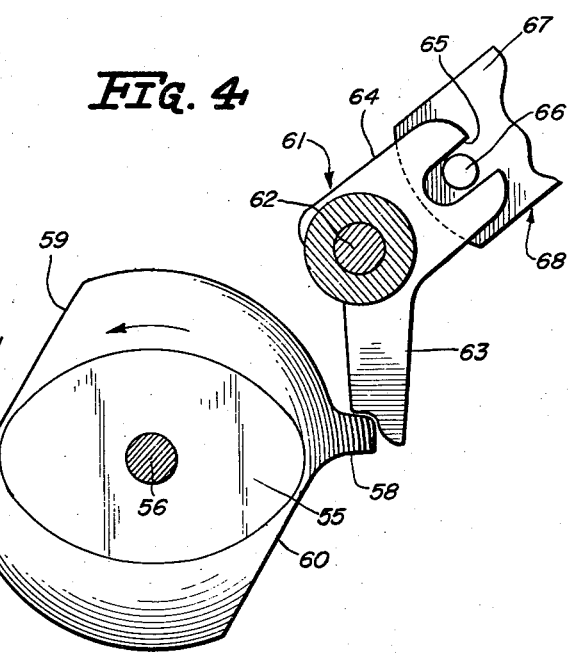
FIGURE 4 is an enlarged detail, in section, taken on the line 4—4 of FIGURE 3.

Seed wheel 22 is provided with uniformly circumferentially spaced cells, as indicated at 52 in FIGURE 2 to receive seed indicated at 53, which is dislodged by stationary stripper 23 as the seed wheel revolves.

The lips of the peripheral seed grasping section 26 of the discharge wheel 27 are held open by the reception therebetween of the lower portion of seed wheel 22. Seed dislodged from wheel 22 by stripper 23 is received between the members 26, which have a bias inwardly to grasp and frictionally hold the seed. Seed is received by the discharge wheel 27 at uniformly circumferentially spaced intervals determined by the spacing of the cells in seed wheel 22, and wheel 27 revolves from the receiving area adjacent the lower portion of wheel 22, to a discharge point at the bottom of the wheel between the plates 15 of the furrow opener 13. A stripper 54 is secured to the plate 15 and extends between the flexible elements 26 at the discharge point of the wheel adjacent the ground to dislodge the seed carried between the elements 26 and allow them to fall into the furrow made by the furrow opener 13.

In order to deposit the seed in the furrow in clusters of 3 or 4 seeds, for hilling purposes, a rotary seed accumulator 55 is provided and rotatably mounted upon a pin 56 carried by the plates 10 and 11.

In the accumulator example shown in the drawing, a pair of projections 57 and 58, spaced 180° apart, are provided and it will be noted that the surface of the accumulator has flattened sections 59 and 60 behind the projections 57 and 58, respectively. As shown in FIGURE 1, a portion of the periphery of the accumulator 55 projects inwardly between the flexible elements 26 of the discharge wheel 27, with one of the projections in the path of the seed carried by the revolving discharge wheel, causing seed to accumulate against the projection.

In order to release the accumulated seed the accumulator 55 is allowed to revolve by frictional engagement with the flexible members 26 a half turn until projection 58 is in the position shown for projection 57.

Member 55 is immobilized to accommodate accumulation of seed against one of the projections 57 and 58 and is released to permit rotation of the accumulator by actuating means including a rockable member 61 pivotally mounted upon a pin 62 carried by the plates 10 and 11 and having an arm or dog 63 engageable with one of the projections on the accumulator. Another arm 64 has a slot 65 therein straddling a pin 66 carried by one arm 67 of a tripping member 68 fulcrumed upon a pin 69 carried by the plates 10 and 11.

Tripping member 68 is in the form of a bellcrank having another arm 70, the end of which carries a pin 71 adapted to bear against the periphery of a wheel 72, mounted on shaft 24, and having circumferentially spaced lugs or teeth 73 projecting therefrom.

Tripping member 68 is biased to rock in a direction about the pivot axis of pin 69 and cause pin 61 to bear against the surface of wheel 72 by the provision of a torsion spring 74, and engagement of one of the teeth 73 of wheel 72 with pin 71 rocks the tripping member 68 in a clockwise direction as viewed in FIGURE 1. This, in turn, rocks member 61 counterclockwise to move arm 63 out of engagement with the lug on accumulator 55, permitting the latter to be revolved by discharge wheel 27. Member 61 returns immediately to its operating position for engagement with lug 57 on the accumulator, permitting lug 58 to project between the flexible elements 26 and accumulate another cluster or group of seeds. The seeds are discharged as a group from wheel 27 by the stripper 54 and form hills at spaced intervals in the furrow.

The number of seeds to be accumulated against the projection 57 or 58 of the accumulator 55 is determined by the number of teeth 73 on actuating wheel 72, it being possible by varying the number of teeth 73 to cause varying numbers of seed to be grouped by the accumulator.

It is believed that the construction and operation of the planting apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a planter having a frame and a seed hopper mounted on the frame, rotatable seed depositing means including disk means mounted on the frame having a portion of the periphery thereof in operative association with said hopper at a seed receiving area, the radially outer portion of said disk means including a pair of peripherally engaged, axially yieldable annular members of flexible material, means for rotating said disk means, seed feeding means mounted in the hopper and insertable between said flexible members to hold them open for the reception of seed therebetween at circumferentially spaced locations during rotation of said seed depositing means, said flexible members being biased to engagement to hold the seed therebetween and carry them by rotation of the disk means to a discharge point adjacent the ground, an accumulator mounted on the frame for rotation about an axis beyond the periphery of said flexible members between said receiving area and said discharge point and having a part projecting between the flexible members in the path of the seed held thereby to accumulate seed thereagainst, said accumulator part having sufficient frictional engagement with said flexible members to be rotated thereby, and actuating means mounted on the frame and operatively engageable with said accumulator to periodically interrupt the rotation thereof by said flexible members.

2. The invention set forth in claim 1, wherein said accumulator has a main body and at least two circumferentially spaced peripheral projections thereon which are alternately movable into position in the path of the seed by rotation of the accumulator.

3. The invention set forth in claim 1, wherein said actuating means includes a rockable member mounted on the frame engageable with said accumulator to hold the latter against rotation by said annular members and a rotatable member mounted on the frame having means thereon periodically engageable with said rockable member to rock the latter in a direction to release said accumulator for rotation by said flexible members.

4. The invention set forth in claim 3, wherein said rotatable member is a wheel having circumferentially spaced teeth projecting from the periphery thereof, said teeth being successively engageable with said rockable member during rotation of the rotatable member to rock said rockable member and to release the accumulator.

References Cited in the file of this patent

UNITED STATES PATENTS

| 1,354,202 | Lafleche | Sept. 28, 1920 |
| 2,085,354 | Erickson | June 29, 1937 |
| 2,637,263 | Schmitz | May 5, 1953 |
| 2,980,041 | Nielsen | Apr. 18, 1961 |

OTHER REFERENCES

Jordan: German application, 1,025,660 printed December 29, 1952 (KL 45b 11).